United States Patent
Henry et al.

(10) Patent No.: US 7,529,912 B2
(45) Date of Patent: ***May 5, 2009

(54) APPARATUS AND METHOD FOR INSTRUCTION-LEVEL SPECIFICATION OF FLOATING POINT FORMAT

(75) Inventors: G. Glenn Henry, Austin, TX (US); Rodney E. Hooker, Austin, TX (US); Terry Parks, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 251 days.

This patent is subject to a terminal disclaimer.

(21) Appl. No.: 11/083,543

(22) Filed: Mar. 18, 2005

(65) Prior Publication Data
US 2005/0188179 A1 Aug. 25, 2005

Related U.S. Application Data

(63) Continuation-in-part of application No. 10/144,595, filed on May 9, 2002.

(60) Provisional application No. 60/554,299, filed on Mar. 18, 2004, provisional application No. 60/356,420, filed on Feb. 12, 2002.

(51) Int. Cl.
*G06F 9/30* (2006.01)
*G06F 9/40* (2006.01)
*G06F 15/00* (2006.01)
*G06F 7/38* (2006.01)
*G06F 9/00* (2006.01)
*G06F 9/44* (2006.01)

(52) U.S. Cl. ............... 712/210; 712/208; 712/209; 712/229

(58) Field of Classification Search ......... 712/208–210, 712/229
See application file for complete search history.

(56) References Cited

U.S. PATENT DOCUMENTS
3,657,705 A 4/1972 Mekota et al.

(Continued)

FOREIGN PATENT DOCUMENTS
CN 1431584 7/2003

(Continued)

OTHER PUBLICATIONS

Patterson & Hennessy; Computer Organization and Design: The Hardware / Software Interface; 1998; Morgan Kaufmann Publishers, Inc.; Second Edition; pp. 177-178, 297.*

(Continued)

*Primary Examiner*—Eric Coleman
*Assistant Examiner*—Corey S Faherty
(74) *Attorney, Agent, or Firm*—Richard K. Huffman; James W. Huffman

(57) ABSTRACT

Apparatus and method are provided for extending a microprocessor instruction set to allow for instruction-level specification of floating point format to be employed during execution of an associated floating point operation. The apparatus includes translation logic and extended execution logic. The translation logic translates an extended instruction into corresponding micro instructions. The extended instruction has an extended prefix and an extended prefix tag. The extended prefix specifies the floating point format. The extended prefix tag indicates the extended prefix, where the extended prefix tag is an otherwise architecturally specified opcode within an instruction set for a microprocessor. The extended execution logic is coupled to the translation logic. The extended execution logic receives the corresponding micro instructions, and executes the associated floating point operation according to the floating point format specified by the extended prefix.

28 Claims, 7 Drawing Sheets

U.S. PATENT DOCUMENTS

| | | | |
|---|---|---|---|
| 4,064,554 A | 12/1977 | Tubbs | |
| 4,217,638 A | 8/1980 | Namimoto et al. | |
| 4,547,849 A | 10/1985 | Louie et al. | |
| 4,851,995 A * | 7/1989 | Hsu et al. | 713/500 |
| 5,029,069 A | 7/1991 | Sakamura | |
| 5,142,679 A | 8/1992 | Owaki et al. | |
| 5,218,712 A | 6/1993 | Cutler et al. | |
| 5,448,744 A | 9/1995 | Eifert et al. | |
| 5,471,595 A | 11/1995 | Yagi et al. | |
| 5,481,684 A | 1/1996 | Richter et al. | |
| 5,687,338 A | 11/1997 | Boggs et al. | |
| 5,751,996 A | 5/1998 | Glew et al. | |
| 5,768,574 A | 6/1998 | Dutton et al. | |
| 5,778,220 A | 7/1998 | Abramson et al. | |
| 5,796,973 A | 8/1998 | Witt et al. | |
| 5,822,778 A | 10/1998 | Dutton et al. | |
| 5,826,089 A | 10/1998 | Ireton | |
| 5,857,103 A | 1/1999 | Grove | |
| 5,870,619 A | 2/1999 | Wilkinson et al. | |
| 5,875,342 A | 2/1999 | Temple | |
| 5,913,049 A | 6/1999 | Shiell et al. | |
| 5,937,199 A | 8/1999 | Temple | |
| 5,991,872 A | 11/1999 | Shiraishi et al. | |
| 6,014,735 A * | 1/2000 | Chennupaty et al. | 712/210 |
| 6,029,222 A | 2/2000 | Kamiya | |
| 6,058,472 A | 5/2000 | Panwar et al. | |
| 6,085,312 A | 7/2000 | Abdallah et al. | |
| 6,157,996 A | 12/2000 | Christie et al. | |
| 6,199,155 B1 * | 3/2001 | Kishida et al. | 712/210 |
| 6,230,259 B1 | 5/2001 | Christie et al. | |
| 6,317,822 B1 | 11/2001 | Padwekar | |
| 6,351,806 B1 | 2/2002 | Wyland | |
| 6,405,305 B1 * | 6/2002 | Meier et al. | 712/222 |
| 6,434,693 B1 | 8/2002 | Senter et al. | |
| 6,456,891 B1 | 9/2002 | Kranich et al. | |
| 6,542,985 B1 | 4/2003 | Johnson et al. | |
| 6,549,999 B2 * | 4/2003 | Kishida et al. | 712/210 |
| 6,560,694 B1 | 5/2003 | McGrath et al. | |
| 6,581,154 B1 | 6/2003 | Zaidi | |
| 6,647,488 B1 | 11/2003 | Takeno et al. | |
| 6,751,737 B1 * | 6/2004 | Russell et al. | 726/34 |
| 6,779,103 B1 * | 8/2004 | Alexander et al. | 712/217 |
| 6,823,414 B2 | 11/2004 | Radhakrishna | |
| 6,883,053 B2 | 4/2005 | Shinagawa et al. | |
| 7,181,596 B2 * | 2/2007 | Henry et al. | 712/209 |
| 2001/0013870 A1 | 8/2001 | Pentkovski et al. | |
| 2002/0194457 A1 | 12/2002 | Akkary | |
| 2003/0159020 A1 | 8/2003 | Henry et al. | |
| 2003/0172252 A1 | 9/2003 | Henry et al. | |
| 2004/0268090 A1 | 12/2004 | Coke et al. | |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Dobb; Microprocessor Resources; 2000; http://web.archive.org/web/20000118231610/http://x86.org/secrets/opcodes/icebp.htm.*

Intel Architecture Software Developer's Manual. vol. 2: Instruction Set Reference. 1999. pp. 2-1 to 2-4, 3-332, 3-353 and B25.

Silberman et al. *An Architectural Framework for Supporting Heterogeneous Instruction-Set Architectures*. Computer, IEEE Computer Society, Long Beach, CA, US vol. 26, No. 6 Jun. 1, 1993. pp. 39-56. ISSN: 0018-0162.

Paap et al, "Power PC™: A Performance Architecture," COMPCON Spring '93, Digest of Papers, San Francisco, CA, IEEE Computer Society, Feb. 22, 1993, pp. 104-108.

Richard L. Sites. "Alpha AXP Architecture." Communications of the Association for Computing Machinery, ACM. New York, NY. vol. 36, No. 2. Feb. 1, 1993. pp. 33-44. XP000358264. ISSN: 0001-0782.

* cited by examiner

FIG. 3

*EXTENDED INSTRUCTION FORMAT*

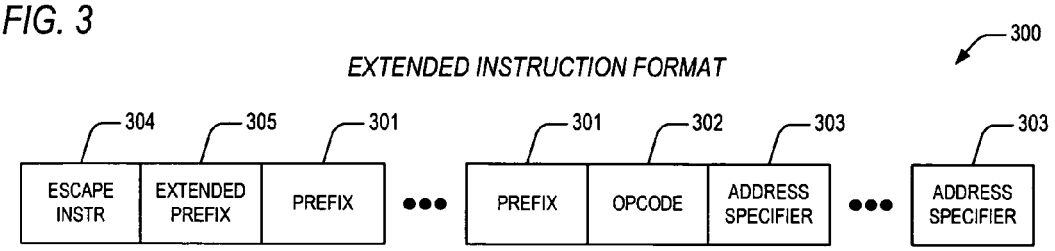

FIG. 4

*8-BIT EXTENDED PREFIX MAP*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

EXTENDED PREFIX FOR SPECIFYING ONE OF FOUR FLOATING POINT CONTROL WORDS

EXTENDED PREFIX FOR DIRECTLY SPECIFYING FLOATING POINT PRECISION & ROUNDING MODE

EXTENDED EXECUTION LOGIC – INDIRECT FLOATING POINT FORMAT SPECIFICATION

EXTENDED EXECUTION LOGIC – DIRECT FLOATING POINT FORMAT SPECIFICATION

APPARATUS AND METHOD FOR INSTRUCTION-LEVEL SPECIFICATION OF FLOATING POINT FORMAT

CROSS-REFERENCE TO RELATED APPLICATIONS

This application claims the benefit of U.S. Provisional Application No. 60/554,299, filed on Mar. 18, 2004, which is herein incorporated by reference for all intents and purposes.

This application is a continuation-in-part of co-pending U.S. patent application Ser. No. 10/144,595, filed on May 9, 2002, which has a common assignee and at least one common inventor, and which is herein incorporated by reference for all intents and purposes. The aforementioned co-pending U.S. patent application claims the benefit of U.S. Provisional Application Ser. No. 60/356,420), which was filed on Feb. 12, 2002.

This application is related to the following co-pending U.S. patent applications, which are filed on the same day as this application, and which have a common assignee and common inventors.

| SERIAL NUMBER | FILING DATE | TITLE |
| --- | --- | --- |
| 11/001212 (CNTR.2176-C1) | Dec. 1, 2004 | APPARATUS AND METHOD FOR EXTENDING A MICROPROCESSOR INSTRUCTION SET |
| 10/144592 (CNTR.2186) | May 9, 2002 | APPARATUS AND METHOD FOR CONDITIONAL INSTRUCTION EXECUTION |
| 10/227572 (CNTR.2187) | Aug. 22, 2002 | APPARATUS AND METHOD FOR SELECTIVE MEMORY ATTRIBUTE CONTROL |
| 10/144593 (CNTR.2188) | May 9, 2002 | APPARATUS AND METHOD FOR SELECTIVE CONTROL OF CONDITION CODE WRITE BACK |
| 10/144590 (CNTR.2189) | May 9, 2002 | MECHANISM FOR EXTENDING THE NUMBER OF REGISTERS IN A MICROPROCESSOR |
| 10/227008 (CNTR.2190) | Aug. 22, 2002 | APPARATUS AND METHOD FOR EXTENDING DATA MODES IN A MICROPROCESSOR |
| 10/227571 (CNTR.2191) | Aug. 22, 2002 | APPARATUS AND METHOD FOR EXTENDING ADDRESS MODES IN A MICROPROCESSOR |
| 10/283397 (CNTR.2192) | Oct. 29, 2002 | SUPPRESSION OF STORE CHECKING |
| 10/384390 (CNTR.2193) | Mar. 10, 2003 | SELECTIVE INTERRUPT SUPPRESSION |
| 10/227583 (CNTR.2195) | Aug. 22, 2002 | NON-TEMPORAL MEMORY REFERENCE CONTROL MECHANISM |
| 10/144589 (CNTR.2198) | May 9, 2002 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating the specification of floating point format at the instruction level into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multimedia operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—accounts for much of the complexity that is present in a modem microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of retaining compatibility with legacy applications and operating modes. Yet while in the past developers have been able to incorporate newly developed architectural features into existing instruction set architectures, the means whereby use of these features is enabled—programmable instructions—have become scarce. More specifically, there are no "spare" instructions in certain instruction sets of interest that provide designers with a way to incorporate newer features into an existing architecture.

In the x86 instruction set architecture, for example, there are no remaining undefined 1-byte opcode values. All 256 opcode values in the primary 1-byte x86 opcode map are taken up with existing instructions. As a result, x86 microprocessor designers today must choose either to provide new features or to retain legacy compatibility. If new programmable features are to be provided, then they must be assigned to opcode values in order for programmers to exercise those features. And if spare opcode values do not remain in an existing instruction set architecture, then some of the existing opcode values must be redefined to provide for specification of the new features. Thus, legacy compatibility is sacrificed in order to make way for new feature growth.

There are a number of features that programmers desire in a present day microprocessor, but which have heretofore been precluded from incorporation because of the aforementioned reasons. One particular feature that is desirable for incorporation is floating point format specification at the instruction level.

Accordingly, the present inventors have observed a need to provide programmers with the capability to specify, at the instruction level, the precision and/or rounding mode that is to be employed during execution of a floating point operation that is prescribed by a corresponding instruction. But, as one skilled in the art will appreciate, present day microprocessor architectures do not provide for such specification. Rather, the architectures typically include a floating point unit that performs floating point operations, and the precision and rounding mode that are employed by the floating point unit during execution of the floating point operations is prescribed within one or more associated hardware registers prior to execution of the instructions that prescribe the floating point operations. Within an x86-compatible microprocessor, these associated hardware registers are collectively called the floating point control word. Thus, the floating point format (i.e., precision and rounding mode) for all subsequent operations that are performed by a floating point unit within the x86-compatible microprocessor is specified by the values of various fields within the floating point control word. In the x86 architecture, a special instruction, FLDCW, must be executed in a program flow in order to change the precision and/or rounding mode of the floating point unit.

Specification of the precision and/or rounding mode for floating point operands and results is vital to the accurate implementation of floating point algorithms because floating point operations are inexact. Thus, it is necessary to provide consistency rules within these algorithms to insure correct results. For instance, the x86 floating point control word can be programmed to specify, say, single-precision operations with a rounding mode prescribing that a rounded result is closest to but not less than the infinitly precise result. This particular floating point format as specified within a given floating point control word may indeed suffice for some floating point algorithms, but it is entirely insufficient for other algorithms which may require a different precision or rounding mode. In fact, one skilled in the art will appreciate that the programming language JAVA often strictly requires the use of single-precision operands. Furthermore, one skilled will also appreciate that present day compilers typically set floating point control words to specify double-precision as the default precision for performing floating point operations. Moreover, one skilled will appreciate that although a typical instruction set architecture will provide an instruction (e.g., FLDCW) that directs a microprocessor to load a new floating point control word from memory in order to change the floating point format, the execution speed of this instruction is excruciatingly slow. This is because all operations within a microprocessor must be synchronized prior to changing the floating point control word. In practice, synchronization of the operations in the microprocessor essentially means that the microprocessor must be stopped, the floating point control word loaded from memory, and the microprocessor restarted. It follows then that the performance of such an operation results in a serious performance bottleneck—even in the presence of a single floating point format change. In fact, the present inventors have noted that many JAVA compilers entirely circumvent this performance bottleneck by employing an indirect—albeit substantially faster—technique to specify a new floating point format. That is, if single-precision operations are required to be performed within a floating point unit whose format is set for double-precision operations, then the compilers emulate the single-precision operations by allowing the floating point unit to perform these operations in double-precision mode, and then the results of the operations are rounded to single-precision by storing the results to memory at the required precision and rounding mode (most instruction set architectures allow floating point precision and/or rounding mode to be expressly specified when executing memory load and store operations). Finally, the results are loaded back from memory (at the desired precision) into the floating point unit for subsequent operations.

A description of the above-noted floating point format specification "workaround" is described in the paper entitled "Optimizing Precision Overhead for x86 Processors," which is taken from "Proceedings of the $2^{nd}$ Java™ Virtual Machine Research and Technology Symposium," Aug. 1-2, 2002, Usenix: San Francisco, by Takeshi Ogasawara et al. And, as one skilled in the art will appreciate, although writing a floating point result out to memory and then reading it back into a floating point unit is not as slow as executing an instruction to load a new floating point control word, such an approach still results in a performance bottleneck.

Thus, the present inventors have noted a need to provide an improved technique for the specification of the floating point format to be used in a floating point operation that does not require synchronization of operations and that does not result in degraded performance as described above.

Therefore, what is desired is to have a plurality of loaded floating point control words that can be set to specify a plurality of desired floating point formats, and to enable a programmer to select one of these floating point control words for use in the operation specified by an associated floating point instruction, where the associated floating point instruction itself prescribes selection of the one of the floating point control words. It is also desirable to enable a programmer to directly specify the floating point format for an associated floating point operation directly, that is, both a floating point operation and the floating point format to be employed during execution of the operation are specified within a single instruction. Yet, although these needs have been noted, many instruction set architectures (including the current x86 instruction set architecture) have no means available to provide the desired features without sacrificing operability of some currently used opcodes.

Accordingly, what is needed is an apparatus and method that incorporate specification of floating point format features into an existing microprocessor architecture having a completely full opcode set, where incorporation of the floating point format specification features allow a conforming microprocessor to retain the capability to execute legacy application programs while concurrently providing application programmers and/or compilers with the capability to control specification of both floating point format and associated floating point operations at the instruction level.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for specification of floating point format. In one embodiment, a microprocessor apparatus is provided, for specifying a floating point format to be employed during execution of an associated legacy floating point operation. The microprocessor apparatus includes translation logic and extended execution logic. The translation logic translates an extended instruction into corresponding micro instructions. The extended instruction has instruction entities according to an existing instruction set, an extended prefix, and an extended prefix tag. The instruction entities comprise a first opcode within the existing instruction set that specifies the associated legacy floating point operation to be executed by a microprocessor. The extended prefix prescribes one of a plurality of floating point control words, where the one of a plurality of floating point control words specifies the floating point format. The extended prefix tag indicates that the extended instruction prescribes architecture extensions which include specification of the floating point format, and indicate that the extended prefix follows, where the extended prefix tag is a second opcode within said instruction set that specifies a different legacy operation to be executed by the microprocessor. The extended execution logic is coupled to the translation logic. The extended execution logic receives the corresponding micro instructions, and executes the associated legacy floating point operation according to the floating point format prescribed by the extended prefix.

One aspect of the present invention contemplates an extension mechanism, for adding floating point format specification features to an existing microprocessor instruction set. The extension mechanism has an extended instruction and a translator. The extended instruction directs a microprocessor to execute an associated legacy floating point operation according to a floating point format, where the extended instruction comprises a selected opcode in the existing microprocessor instruction set followed by an n-bit extended prefix and extended instruction entities. The selected opcode indicates that the extended instruction prescribes architecture extensions which include specification of the floating point format, and indicates that the n-bit extended prefix follows, the n-bit extended prefix indicates one of a plurality of floating point control words, where the one of a plurality of floating point control words specifies the floating point format, and where the extended instruction entities are configured to prescribe the associated legacy floating point operation, and where the extended instruction entities comprise another opcode in the existing microprocessor instruction set that specifies another legacy operation . The translator receives the extended instruction, and generates a micro instruction sequence directing the microprocessor to execute the associated legacy floating point operation according to the floating point format.

Another aspect of the present invention comprehends an instruction set extension apparatus, for providing instruction-level floating point format specification capabilities to an existing microprocessor instruction set. The instruction set extension apparatus includes an escape tag, a floating point format specifier, and extended floating point execution logic. The escape tag is received by translation logic, and indicates that accompanying parts of a corresponding instruction prescribe an extended legacy operation to be performed by a microprocessor, and indicates that the corresponding instruction prescribes architecture extensions which include specification of floating point format, where the escape tag is a first opcode entity that specifies a first legacy operation within the existing microprocessor instruction set. The floating point format specifier is one of the accompanying parts. The floating point format specifier prescribes one of a plurality of floating point control words, where the one of a plurality of floating point control words specifies a floating point format to be employed during execution of the extended legacy operation. The remainder of the accompanying parts comprise a second opcode entity and an optional plurality of address specifier entities. The extended floating point execution logic is coupled to the translation logic. The extended floating point execution logic executes the extended legacy operation according to the floating point format.

A further aspect of the present invention provides a method for extending a microprocessor instruction set to provide for instruction-level specification of a floating point format. The method includes providing an extended instruction, the extended instruction including an extended tag along with an extended prefix, wherein the extended tag is a first opcode in the microprocessor instruction set that specifies a first legacy operation; via the extended tag, indicating that the extended instruction prescribes architecture extensions which include specification of the floating point format, and indicating that the extended prefix follows: prescribing, via the extended prefix and remaining parts of the extended instruction, a second legacy operation to be executed, where the prescribing includes first specifying the second legacy operation via a second opcode in the microprocessor instruction set and second specifying via the extended prefix one of a plurality of floating point control words, where the one of a plurality of floating point control words specifies the floating point format for the second legacy operation. The method also includes executing the second legacy operation according to the first and second specifying.

BRIEF DESCRIPTION OF THE DRAWINGS

These and other objects, features, and advantages of the present invention will become better understood with regard to the following description, and accompanying drawings where:

FIG. 3 is a block diagram featuring an extended instruction format according to the present invention;

FIG. 4 is a table showing how extended architectural features are mapped to logic states of bits in an 8-bit extended prefix embodiment according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
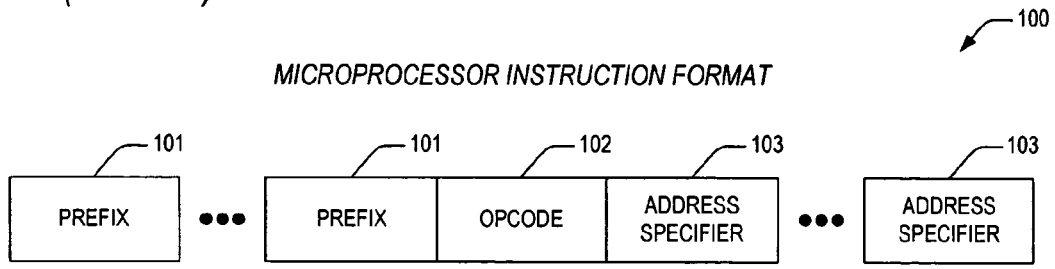
FIG. 1 is a block diagram illustrating a related art microprocessor instruction format.
Figure 2:
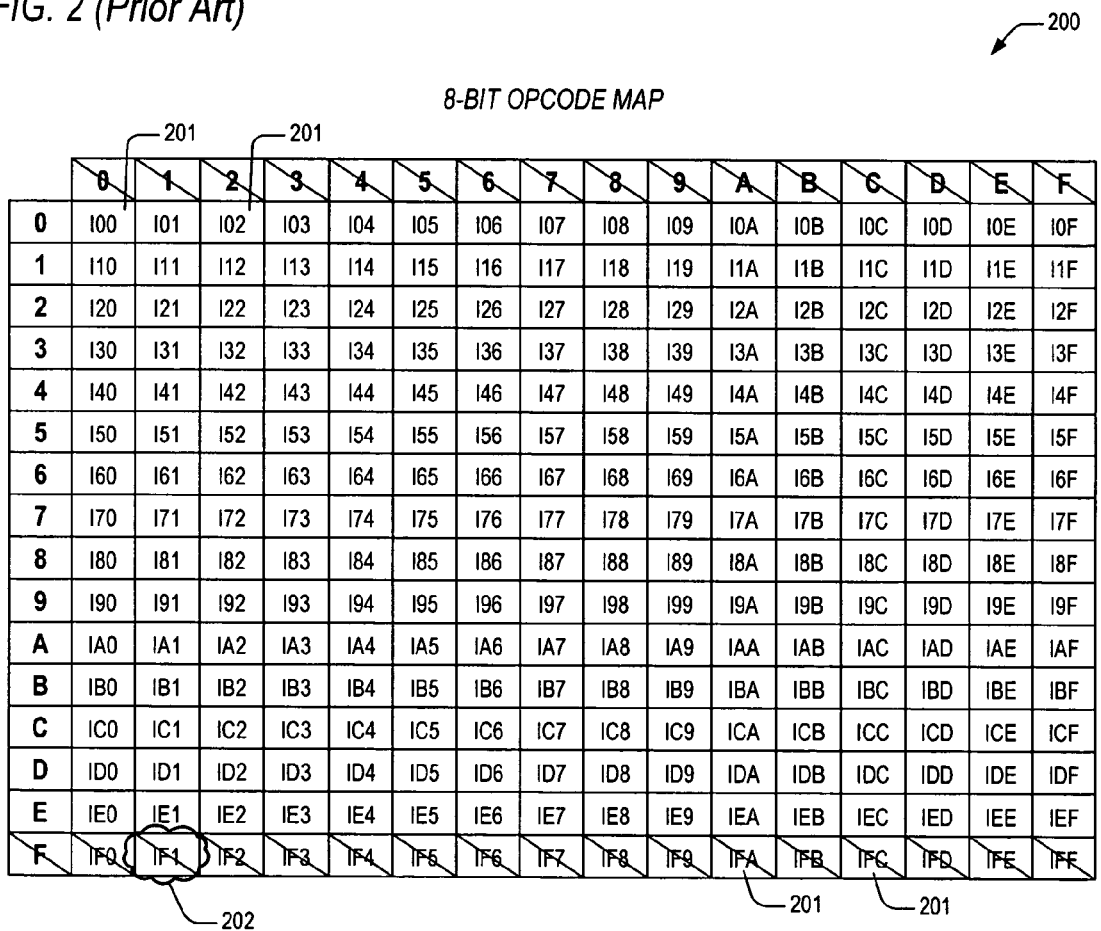
FIG. 2 is a table depicting how instructions in a instruction set architecture are mapped to logic states of bits in an 8-bit opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1-2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1-2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3-11. By employing an existing, yet obsolete, opcode as a prefix tag for an extended instruction that follows, the present invention enables microprocessor designers to overcome the limitations of completely full instruction set architectures, thereby allowing them to provide specification of floating point format capabilities while concurrently retaining all of the instructions and related features that are required to run legacy application programs.

Turning to FIG. 1, a block diagram is presented illustrating a related art microprocessor instruction format 100. The related art instruction 100 has a variable number of instruction entities 101-103, each set to a specified value, that together make up a specific instruction 100 for a microprocessor. The specific instruction 100 directs the microprocessor to perform a specific operation such as adding two operands together, or moving an operand from memory to an internal register. Typically, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to precede an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in some present day microprocessors direct operations to be executed using different operand sizes (e.g., 8-bit, 16-bit, 32-bit). Accordingly, these processors are programmed to a default operand size (say, 32-bit), and prefixes 101 are provided in their respective instruction sets enabling programmers to selectively override the default operand size (say, to perform 16-bit operations) on an instruction-by-instruction basis. Selectable operand size is merely one example of an architectural feature that spans a significant number of the operations (e.g., add, subtract, multiply, Boolean logic, etc.) prescribed by opcodes 102 within many present day microprocessors.

One familiar instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and remaing prefixes 101 which cause associated operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to logic states of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCK-LPS) operation instead of the Add With Carry (ADC). This is because alternative translation rules are applied when an x86 processor encounters prefix 0FH. Features such as described in this x86 example are enabled in part in a present day microprocessor because instruction translation/decoding logic in the microprocessor interprets the entities 101-103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs that do not employ those specific opcode states. For example, a legacy program which never employs x86 opcode 0FH will still run on a present day x86 microprocessor. And a newer application program, by using x86 opcode 0FH as a prefix 101, can benefit from a substantial number of x86 architectural features that have been more recently incorporated into the architecture to include single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have exhausted their instruction set resources in terms of providing enhancements because of a very straightforward reason: all of the available/spare opcode states have been used up. That is, all of the opcode values in the opcode map 200 have been architecturally specified. And when all of the available opcode values have been assigned as either opcode entities 102 or prefix entities 101, then there are no more opcode values remaining to provide for the incorporation of new features. This significant problem exists in many microprocessor architectures today and consequently forces designers to choose between adding architectural features to a design and retaining compatibility with older programs.

The instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One fallback alternative to completely annihilating an existing instruction set and replacing it with a new format 100 and opcode map 200 is to substitute new instruction meanings for only a subset of existing opcodes 201, for instance opcodes 40H through 4FH in FIG. 2. Under this fallback technique, a conforming microprocessor operates exclusively in one of two operating modes: a legacy-compatible mode, where opcodes 40H-4FH are interpreted according to legacy rules, or an enhanced mode, where opcodes 40H-4FH are interpreted according to enhanced architectural rules. This technique indeed enables designers to incorporate new features into a design, yet when the conforming microprocessor is running in an enhanced mode it excludes execution of any application program that uses opcodes 40H-4FH. Hence, from the standpoint of retaining legacy compatibility, the fallback legacy-compatible/enhanced mode technique is not necessarily favorable.

The present inventors, however, have observed the use frequency of certain opcodes 201 in instruction sets 200 having fully-populated opcode spaces over the breadth of application programs composed for execution on compliant microprocessors. They have consequently noted that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any existing application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 is obsolete. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit floating point format specifier prefix whereby programmers are allowed to prescribe a conventional operation for execution by a microprocessor (e.g., addition, subtraction, Boolean operation, operand manipulation, etc.) and, within the same instruction, specify a desired floating point format to be employed during the execution of a subsequent floating point operation (if the instruction associated with the n-bit prefix prescribes an operation other than floating point) or a floating point operation specified within the same instruction that contains the n-bit prefix. Alternative embodiments are discussed herein that additionally enable a programmer to directly specify floating point format via the n-bit prefix or to specify one of a plurality of floating point control words, where each of the plurality of floating point control words specifies a floating point format. The present invention will now be further discussed with reference to FIGS. 3-11.

Turning to FIG. 3, a block diagram is presented featuring an extended instruction format 300 according to the present invention. Very much like the format 100 discussed with reference to FIG. 1, the extended instruction format 300 has a variable number of instruction entities 301-305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, where the operands are located, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301-303 in a formatted extended instruction 300. The purpose of the two additional entities 304, 305 is to allow for specification of a floating point format to be employed during the execution of one or more floating point operations. The two additional entities 304, 305 provide for the incorporation of instruction-level floating point specification features which would otherwise be not provided for within a fully populated instruction set architecture. The optional entities 304, 305 are an extended instruction tag 304 and an extended floating point format specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the floating point format specifier prefix 305, or extended features specifier 305, follows, where the floating point format specifier 305 prescribes a floating point format to be employed during execution of one or more associated floating point operations. In one embodiment, the escape tag 304 indicates that accompanying parts 301-303, 305 of a corresponding extended instruction 300 prescribe an extended operation to be performed by the microprocessor. The n-bit extended prefix 305, or floating point format specifier 305, indicates, in one embodiment, one of a plurality of floating point control words, where each of the plurality of floating point control words prescribe one of a plurality of floating point formats to be employed during execution of a floating point operation that is either specified by the extended instruction 300 or that is specified by a following instruction. In an alternative embodiment, the n-bit extended prefix 305 directly indicates a floating point format to be employed during execution of a floating point operation that is either specified by the extended instruction 300 or that is specified by a following instruction.

To summarize the floating point format specification technique according to the present invention, an instruction extension is configured from one of the opcodes/instructions 304 in an existing instruction set architecture and an extended prefix 305. The selected opcode instruction serves as an indicator 304 that the instruction 300 is an extended features instruction 300 (that is, it prescribes extensions to the microprocessor architecture), and the extended prefix 305 prescribes a floating point format to be employed during execution of an associated floating point operation. In one embodiment, the extended prefix 305 is 8-bits in size.

Now turning to FIG. 4, a table 400 is presented showing how floating point format specification extensions are mapped to logic states of bits in an 8-bit extended prefix embodiment according to the present invention. Similar to the opcode map 200 discussed with reference to FIG. 2, the table 400 of FIG. 4 presents an exemplary 8-bit floating point format specifier prefix map 400 that associates up to 256 values of an 8-bit extended prefix entity 305 with corresponding floating point format specifiers 401 (e.g., E34, E4D, etc.) to be used during execution of an associated floating point operation. In the case of an x86 embodiment, the 8-bit extended feature prefix 305 according to the present invention serves to provide for specifiers 401 (i.e., E00-EFF) which are not otherwise provided for by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

In embodiments that correspond to the types of floating point format specification and representation means common to many present day microprocessors, format combinations can be specified for include, for example, operand and result precision such as single-precision, double-precision, extended-precision, and rounding mode such as round to nearest (even), round down (toward negative infinity), round up (toward positive infinity), and round toward zero (truncate). The specific floating point format specification parameters described above, however, are not provided to limit the scope of the present invention to one particular set floating point format specifiers. The above embodiments are provided, rather, as examples of how a floating point format specifier prefix 305 is encoded according to the present invention. One skilled in the art will appreciate that configuration of a particular floating point format specifier prefix 305 is based upon how corresponding floating point formats are represented and stored in a corresponding microprocessor.

Figure 5:
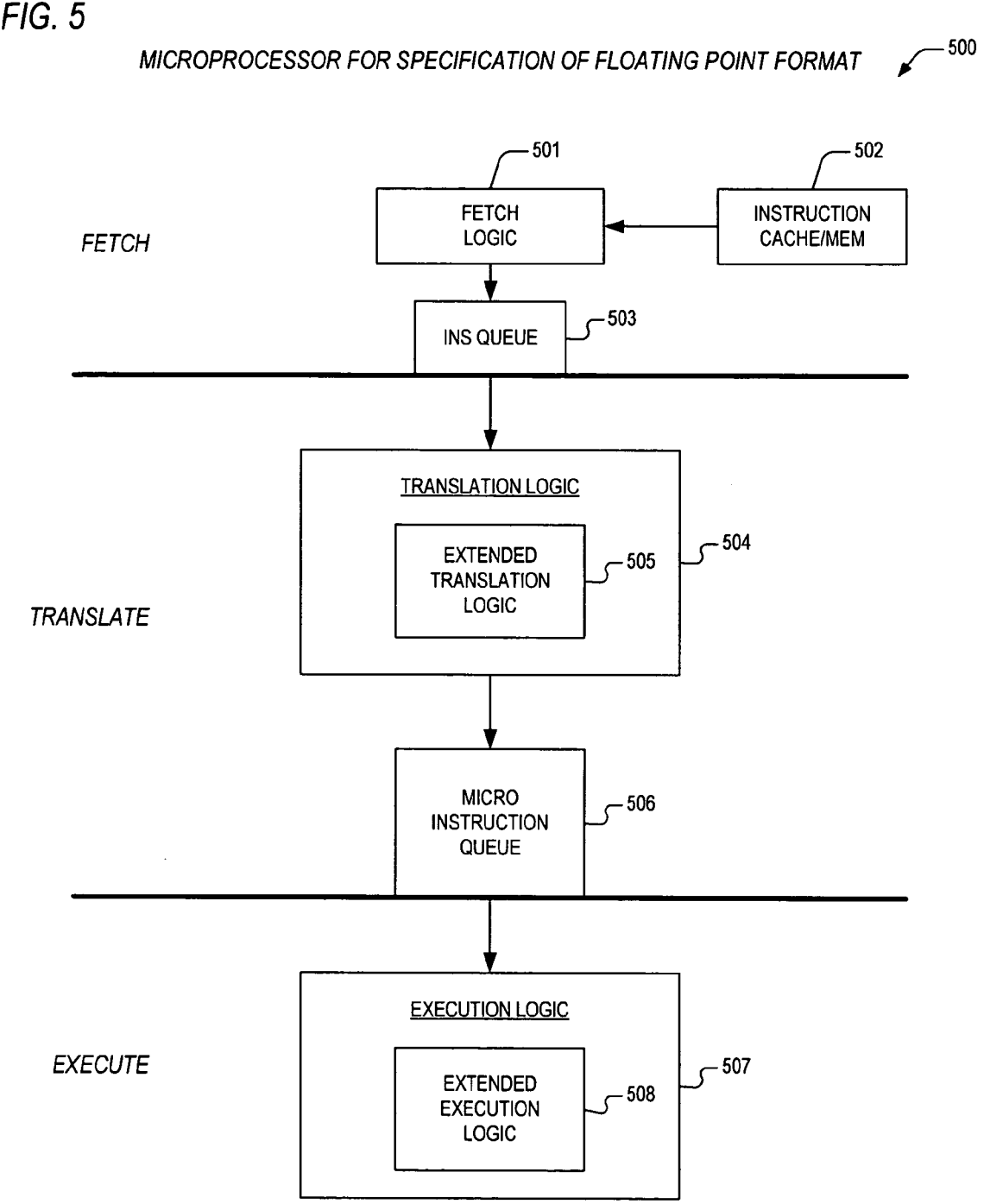
FIG. 5 is a block diagram illustrating a pipeline microprocessor for specification of floating point format according to the present invention.

Now referring to FIG. 5, a block diagram is presented illustrating a pipeline microprocessor 500 according to the present invention for enabling instruction-level specification of floating point format. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves instructions formatted according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that direct the microprocessor 500 to perform the operations prescribed by the instructions. The extended translation logic 505 detects those instructions having an extended prefix tag according to the present invention and also provides for translation/decoding of corresponding floating point format specifier prefixes. In an x86 embodiment, the extended translation logic 505 is configured to detect an extended prefix tag of value F1H, which is the x86 ICE BKPT opcode. Micro instruction fields are provided in the micro instruction queue 506 to specify a floating point format to be employed during execution of an associated floating point operation.

The micro instructions are provided from the micro instruction queue 506 to the execution logic 507, wherein the extended execution logic 508 detects micro instructions having floating point format specification features enabled as indicated by the micro instruction fields. The extended execution logic 508 establishes a floating point format as directed by the micro instructions and performs the operation prescribed by the micro instructions to generate a corresponding result. If the operation prescribed by the micro instructions is a floating point operation, then the extended execution logic 508 performs the floating point operation and generates the corresponding result according to the floating point format prescribed by the micro instructions.

One skilled in the art will appreciate that the microprocessor 500 described with reference to FIG. 5 is a simplified representation of a present day pipeline microprocessor 500. In fact, a present day pipeline microprocessor 500 comprises upwards to 20-30 pipeline stages. However, these stages can be generally categorized into those three stage groups shown in the block diagram 500 and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Figure 6:
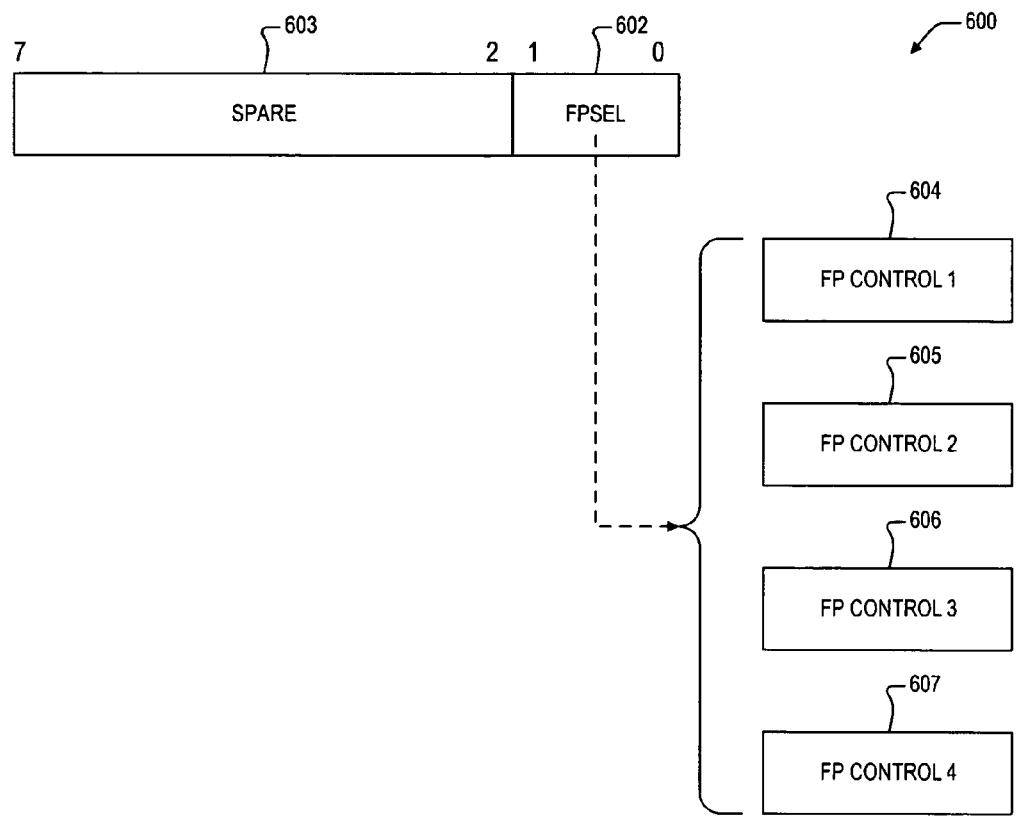
FIG. 6 is a block diagram featuring one embodiment of an extended prefix for specification of floating point format according to the present invention.

Turning now to FIG. 6, a block diagram is presented featuring one embodiment of an extended prefix 600 for specification of floating point format according to the present invention. The extended prefix 600 is an 8-bit prefix 600 and has a floating point control word select field FPSEL 602 comprising bits 1:0 and a spare field SPARE 603 comprising bits 7:2. According to the value of FPSEL 602, one of four floating point control words 604-607 is prescribed for employment during execution of an associated floating point operation. Each of the floating point control words 604-607 comprise fields (not shown) that specify a corresponding floating point format as described herein. In another embodiment, no spare field 603 is provided for, and the FPSEL field 602 is 8-bits wide, thus enabling specification of any number of floating point control words up to maximum number of 256. In addition to specifying floating point format (i.e., precision and rounding mode), each of the above-noted floating point control word embodiments additionally contemplate specification of floating point exception masks to block typical floating point exceptions including precision exceptions, underflow, overflow, zero divide, denormal operand, invalid operation, and like exceptions provided for in present day microprocessors.

Figure 7:
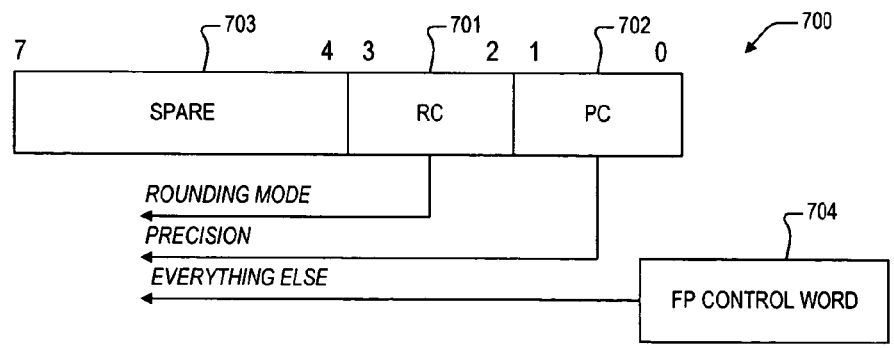
FIG. 7 is a block diagram depicting an alternative embodiment of an extended prefix for specification of floating point format according to the present invention.

FIG. 7 is a block diagram of an alternative embodiment of an extended prefix 700 for specification of floating point format according to the present invention. The alternative extended prefix 700 has a 2-bit precision code field PC 702, a 2-bit rounding code RC field 701, and 4-bit spare field 703. According to the value of the rounding code field 701 and the precision code field 702, one of up to four precision formats and one of up to four rounding modes can be directly specified for employment during execution of an associated floating point operation. The directly specified precision format and rounding mode, in operation, override the rounding mode and precision format that are currently specified by a floating point control word 704 in the microprocessor, however, remaining data (such as floating point exception mask bits) is provided by the floating point control word. The fields 701-702 can be alternatively increased in size to accommodate additional rounding modes and precisions according to that provided for by a particular instruction set architecture.

Figure 8:
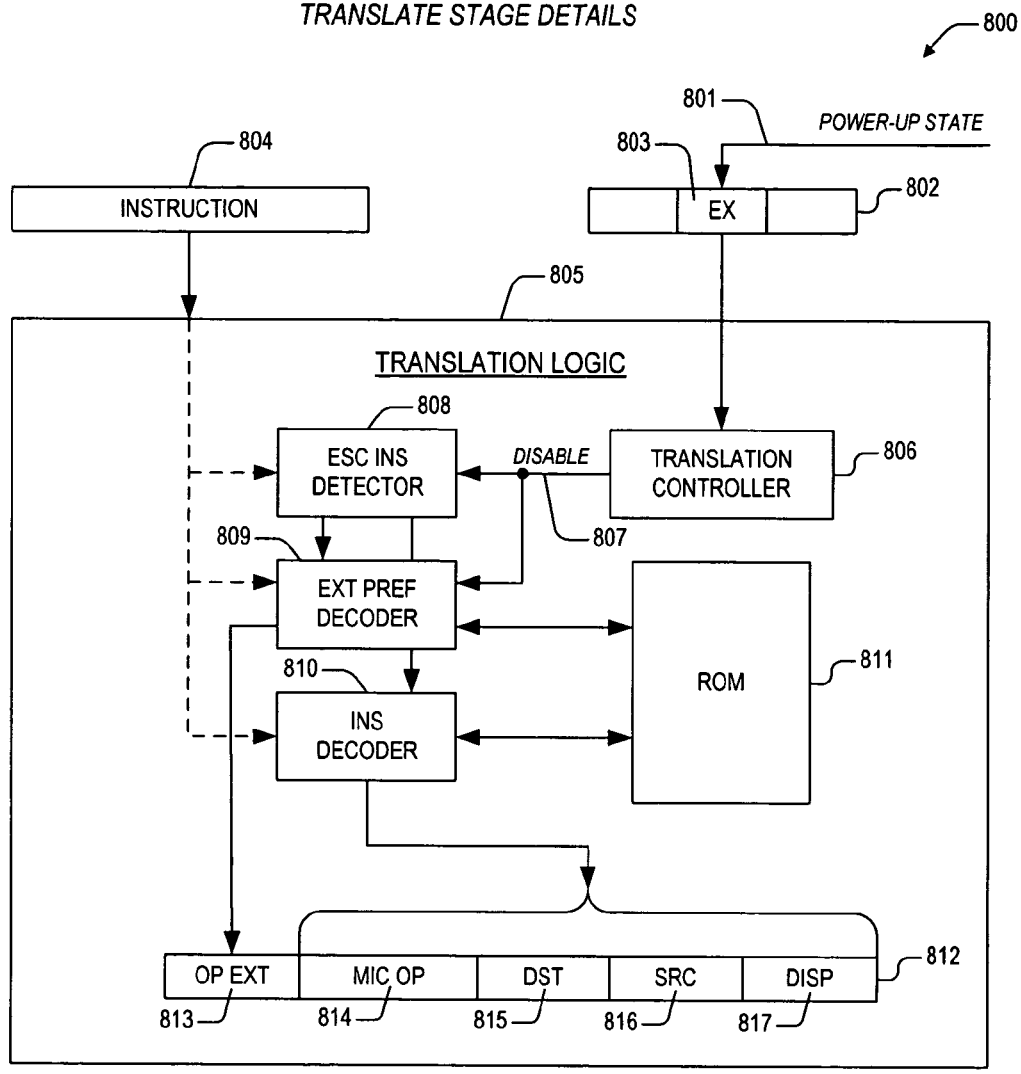
FIG. 8 is a block diagram featuring details of translate stage logic within the microprocessor of FIG. 5.

Turning now to FIG. 8, a block diagram is presented featuring details of translate stage logic 800 within the microprocessor of FIG. 5. The translate stage logic 800 has an instruction buffer 804 that provides an extended instruction according to the present invention to translation logic 805. The translation logic 805 is coupled to a machine specific register 802 that has an extended features field 803. The translation logic 805 has a translation controller 806 that provides a disable signal 807 to an escape instruction detector 808 and an extended prefix decoder 809. The escape instruction detector 808 is coupled to the extended prefix decoder 809 and an instruction decoder 810. The extended prefix decoder 809 and the instruction decoder 810 access a control read-only memory (ROM) 811, wherein are stored template micro instruction sequences that correspond to some of the extended instructions. The translation logic 805 also has a micro instruction buffer 812 having an opcode extension field 813, a micro opcode field 814, a destination field 815, a source field 816, and a displacement field 817.

Operationally, during power-up of the microprocessor, the state of the extended field 803 within the machine specific register 802 is established via signal power-up state 801 to indicate whether the particular microprocessor is capable of translating and executing extended instructions according to the present invention. In one embodiment, the signal 801 is derived from a feature control register (not shown) that reads a fuse array (not shown) or like element configured during fabrication of the part. The machine specific register 802 provides the state of the extended features field 803 to the translation controller 806. The translation control logic 806 controls whether or not instructions from the instruction buffer 804 are translated according to extended floating point format specification translation rules or according to existing translation rules. Such a control feature is provided to allow supervisory applications (e.g., BIOS) to enable/disable extended execution features of the microprocessor. If extended features are disabled, then instructions having the opcode state selected as the extended features tag would be translated according to existing translation rules. In an x86 embodiment having opcode state F1H selected as the tag, an occurrence of F1H under conventional translation would result in an illegal instruction exception. Under extended translation rules, however, occurrence of the tag would be detected by the escape instruction detector 808. The escape instruction detector 808 would accordingly disable operation of the instruction decoder 810 during translation/decode of a following extended floating point format specifier prefix by the extended prefix decoder 809 and would enable the instruction decoder 810 for translation/decode of the remaining parts of the extended instruction. Certain instructions would cause access to the control ROM 811 to obtain corresponding micro instruction sequence templates. The opcode extension field 813 of the micro instruction buffer 812 is configured by the prefix decoder 809 to prescribe a particular floating point format as specified by the floating point format specifier prefix. In one embodiment, the opcode extension field 813 prescribes one of a plurality of floating point control words. In an alternative embodiment, the opcode extension field 813 directly specifies floating point format. The remaining buffer fields 814-817 specify the corresponding operation and are configured by the instruction decoder 810. Configured micro instructions 812 are provided to a micro instruction queue (not shown) for subsequent execution by the processor.

Figure 9:
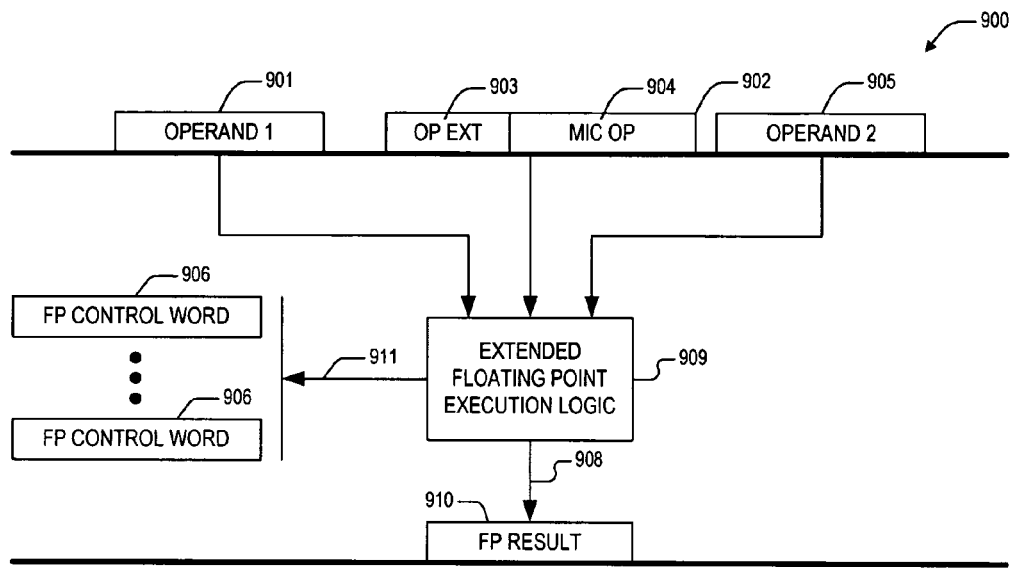
FIG. 9 is a block diagram illustrating extended execution logic within the microprocessor of FIG. 5.

Now referring to FIG. 9, a block diagram is presented illustrating one embodiment of extended execution logic 900 within the microprocessor of FIG. 5. The extended execution logic 900 has extended floating point execution logic 909 that is coupled to a plurality of floating point control words 906 and a to a floating point result buffer 910. Two operands, OPERAND 1 and OPERAND 2, are retrieved from operand registers 901, 905 by the extended floating point execution logic 909. In one embodiment, the operand registers 901, 905 specify floating point registers (not shown) within the extended floating point execution logic 909 that contain floating point operands to be employed during execution of an associated floating point operation. A micro instruction register 902 provides a micro instruction to the extended floating point execution logic 909. The micro instruction register 902 has an opcode extension field 903 and a micro opcode field 904.

In operation, when an extended instruction employing floating point format specification features is translated into a micro instruction sequence according to the present invention, extended micro instructions are provided to the extended execution logic 900 via the micro instruction register 902 along with applicable operands (or operand register specifiers) in registers 901 and 905. The opcode extension field 903 specifies a particular one of the plurality of floating point control words 906 for employment during execution of an associated floating point operation. In one embodiment, the associated floating point operation is specified by the micro opcode field 904. Accordingly, the extended floating point execution logic 909 performs the associated floating point operation and generates the floating point result in accordance with the floating point format specified by the particular one of the plurality of floating point control words 906. The floating point result is provided to the floating point result register 910. In another embodiment, the associated floating point operation is not specified by the micro opcode field 904. Accordingly, the extended floating point execution logic 909 selects a floating point format specified by the particular one of the plurality of floating point control words 906 and employs this format for execution of subsequently directed floating point operations.

Figure 10:
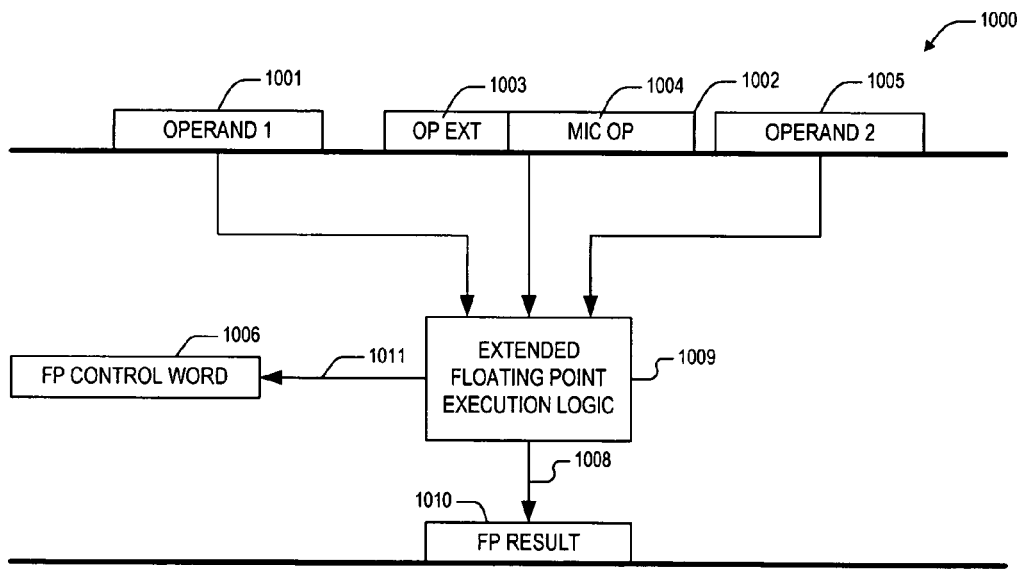
FIG. 10 is a block diagram illustrating an alternative embodiment of extended execution logic within the microprocessor of FIG. 5.

Now referring to FIG. 10, a block diagram is presented illustrating an alternative embodiment of extended execution logic 1000 within the microprocessor of FIG. 5. The extended execution logic 1000 has extended floating point execution logic 1009 that is coupled to a floating point control word 1006 and a to a floating point result buffer 1010. Two operands, OPERAND 1 and OPERAND 2, are retrieved from operand registers 1001, 1005 by the extended floating point execution logic 1009. In one embodiment, the operand registers 1001, 1005 specify floating point registers (not shown) within the extended floating point execution logic 1009 that contain floating point operands to be employed during execution of an associated floating point operation. A micro instruction register 1002 provides a micro instruction to the extended floating point execution logic 1009. The micro instruction register 1002 has an opcode extension field 1003 and a micro opcode field 1004.

In operation, when an extended instruction employing floating point format specification features is translated into a micro instruction sequence according to the present invention, extended micro instructions are provided to the extended execution logic 1000 via the micro instruction register 1002 along with applicable operands (or operand register specifiers) in registers 1001 and 1005. The opcode extension field 1003 directly specifies a floating point format for employment during execution of an associated floating point operation. In an embodiment where the floating point format comprises floating point precision and rounding mode, remaining format parameters (e.g., floating point exception mask) that are required for execution of an associated floating point operation are provided by the floating point control word 1006 to the extended floating point execution logic 1009 via bus 1011. In an alternative embodiment where only floating point precision is specified by the opcode extension 1003, then rounding mode and remaining format parameters that are required for execution of an associated floating point operation are provided by the floating point control word 1006 to the extended floating point execution logic 1009 via bus 1011. Other embodiments contemplate specification of combinations of floating point format parameters via the opcode extension 1003 and supply of remaining format parameters via the floating point control word 1006. In one embodiment, the associated floating point operation is specified by the micro opcode field 1004. Accordingly, the extended floating point execution logic 1009 performs the associated floating point operation and generates the floating point result in accordance with the floating point format directly specified by the opcode extension 1003 and the floating point control word 1006 (if required). The floating point result is provided to the floating point result register 1010. In another embodiment, the associated floating point operation is not specified by the micro opcode field 1004. Accordingly, the extended floating point execution logic 1009 selects a floating point format specified by the opcode extension 1003 and the floating point control word 1006 (if required) and employs this format for execution of subsequently directed floating point operations.

Figure 11:
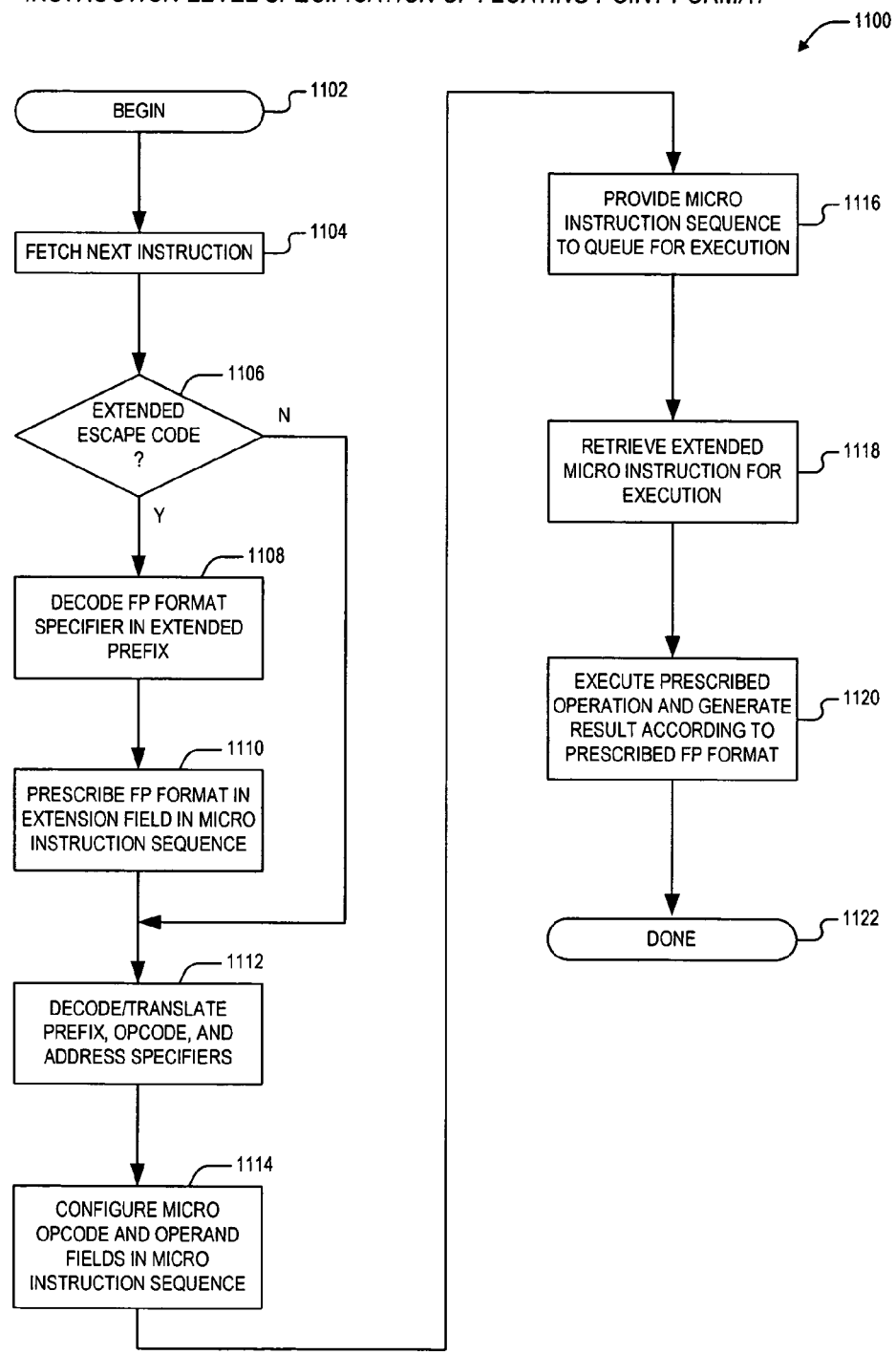
FIG. 11 is a flow chart depicting a method for translating and executing instructions according to the present invention that provide for specification of floating point format at the instruction level.

Now referring to FIG. 11, a flow chart 1100 is presented depicting a method for translating and executing instructions according to the present invention that provide for instruction-level specification of floating point format. Flow begins at block 1102 wherein a program configured with extended instructions having floating point format specification features is provided to a microprocessor. Flow then proceeds to block 1104.

At block 1104, a next instruction is fetched from cache/memory. Flow then proceeds to decision block 1106.

At decision block 1106, the next instruction fetched in block 1104 is evaluated to determine whether or not it contains an extended escape tag/code. If not, then flow proceeds to block 1112. If the extended escape code is detected, then flow proceeds to block 1108.

At block 1108, because an extended escape tag has been detected in block 1106, translation/decoding is performed on an extended specifier prefix to determine a floating point format for employment during execution of an associated floating point operation. Flow then proceeds to block 1110.

At block 1110, corresponding fields of a micro instruction sequence are configured to indicate the floating point format as prescribed by the extended prefix. Flow then proceeds to block 1112.

At block 1112, the remaining parts of the instruction (e.g., prefix entities, opcode, address specifiers) are translated/decoded to determine the operation to be performed along with associated operand attributes. Flow then proceeds to block 1114.

At block 1114, remaining fields of a micro instruction sequence are configured to prescribe the specified operation along with its operand specifications. Flow then proceeds to block 1116.

At block 1116, the micro instruction sequence, comprising the opcode extension field configured in block 1110 along with the remaining fields configured in block 1114, is provided to a micro instruction queue for execution by the microprocessor. Flow then proceeds to block 1118.

At block 1118, the micro instruction sequence is retrieved by extended execution logic according to the present invention. Flow then proceeds to block 1120.

At block 1120, the extended execution logic executes the prescribed operation and generates the result according to the floating point format prescribed in block 1110. Flow then proceeds to decision block 1120.

At block 1120, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to preclude write back of a result corresponding to execution of an operation specified by remaining parts of an extended instruction, where write back of the result is conditioned upon satisfaction of a specified criterion.

In addition, the present invention has been exemplified by a microprocessor having a well-known set of floating point format specifiers such as single-precision, double-precision, double-extended precision, and the rounding modes noted above. And although these types of specifiers prevail in use today, it is not the intention of the present inventors to restrict application of the invention to only these types of specifiers.

Furthermore, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus, for specifying a floating point format to be employed during execution of an associated legacy floating point operation, the microprocessor apparatus comprising:
   translation logic, for translating an extended instruction into corresponding micro instructions, wherein said extended instruction comprises:
      instruction entities according to an existing instruction set, wherein said instruction entities comprise a first opcode within said existing instruction set that specifies the associated legacy floating point operation to be executed by a microprocessor,
      an extended prefix, for prescribing one of a plurality of floating point control words, wherein said one of a plurality of floating point control words specifies the floating point format; and
      an extended prefix tag, for indicating that said extended instruction prescribes architecture extensions which include specification of the floating point format, and for indicating that said extended prefix follows, wherein said extended prefix tag is a second opcode within said existing instruction set that specifies a different legacy operation to be executed by said microprocessor; and
   extended execution logic, coupled to said translation logic, for receiving said corresponding micro instructions, and for executing the associated legacy floating point operation according to the floating point format prescribed by said extended prefix.

2. The microprocessor apparatus as recited in claim 1, wherein each of said plurality of floating point control words specifies a floating point precision and rounding mode.

3. The microprocessor apparatus as recited in claim 2, wherein said each of said plurality of floating point control words further specifies a floating point exception mask.

4. The microprocessor apparatus as recited in claim 1, wherein said extended prefix comprises 8 bits.

5. The microprocessor apparatus as recited in claim 1, wherein said existing instruction set comprises the x86 instruction set.

6. The microprocessor apparatus as recited in claim 5, wherein said extended prefix tag comprises opcode F1 (ICE BKPT) in the x86 instruction set.

7. The microprocessor apparatus as recited in claim 1, wherein said translation logic comprises:
   escape instruction detection logic, for detecting said extended prefix tag; and
   extended prefix decoding logic, coupled to said escape instruction detection logic, for translating said extended prefix, and for configuring a micro opcode extension field within said corresponding micro instructions, said micro opcode extension field prescribing the floating point format.

8. The microprocessor apparatus as recited in claim 7, wherein said translation logic further comprises:
   instruction decoding logic, for configuring remaining fields within said corresponding micro instructions, said remaining fields specifying the associated legacy floating point operation.

9. An extension mechanism, for adding floating point format specification features to an existing microprocessor instruction set, the extension mechanism comprising:
   an extended instruction, configured to direct a microprocessor to execute an associated legacy floating point operation according to a floating point format, wherein said extended instruction comprises a selected opcode in the existing microprocessor instruction set followed by an n-bit extended prefix and extended instruction entities, said selected opcode indicating that said extended instruction prescribes architecture extensions which include specification of the floating point format, and indicating that said n-bit extended prefix follows, said n-bit extended prefix indicating one of a plurality of floating point control words, wherein said one of a plurality of floating point control words specifies said floating point format, and wherein said extended instruction entities are configured to prescribe said associated legacy floating point operation, and wherein said extended instruction entities comprise another opcode in the existing microprocessor instruction set that specifies another legacy operation; and
   a translator, configured to receive said extended instruction, and configured to generate a micro instruction sequence directing said microprocessor to execute said associated legacy floating point operation according to said floating point format.

10. The extension mechanism as recited in claim 9, wherein each of said plurality of floating point control words specifies a floating point precision and rounding mode.

11. The extension mechanism as recited in claim 10, wherein said each of said plurality of floating point control words further specifies a floating point exception mask.

12. The extension mechanism as recited in claim 9, wherein the existing microprocessor instruction set is the x86 microprocessor instruction set.

13. The extension mechanism as recited in claim 12, wherein said selected opcode comprises opcode ICE BKPT (i.e., opcode F1) in the x86 microprocessor instruction set.

14. The extension mechanism as recited in claim 9, wherein said translator comprises:
- an escape instruction detector, for detecting said selected opcode within said extended instruction; and
- an extended prefix decoder, coupled to said escape instruction detector, for translating said n-bit extended prefix, and for generating a micro opcode extension field within said sequence of micro instructions that prescribes said floating point format.

15. An instruction set extension apparatus, for providing instruction-level floating point format specification capabilities to an existing microprocessor instruction set, the instruction set extension apparatus comprising:
- an escape tag, for reception by translation logic, and for indicating that accompanying parts of a corresponding instruction prescribe an extended legacy operation to be performed by a microprocessor, and for indicating that said corresponding instruction prescribes architecture extensions which include specification of floating point format, wherein said escape tag is a first opcode entity that specifies a first legacy operation within the existing microprocessor instruction set;
- a floating point format specifier, being one of said accompanying parts, for prescribing one of a plurality of floating point control words, wherein said one of a plurality of floating point control words specifies a floating point format to be employed during execution of said extended legacy operation;
- wherein the remainder of said accompanying parts comprise a second opcode entity and an optional plurality of address specifier entities; and
- extended floating point execution logic, coupled to said translation logic, for executing said extended legacy operation according to said floating point format.

16. The instruction set extension apparatus as recited in claim 15, wherein said floating point format specifier comprises an 8-bit data entity.

17. The instruction set extension apparatus as recited in claim 15, wherein the existing microprocessor instruction set is the x86 microprocessor instruction set.

18. The instruction set extension apparatus as recited in claim 16, wherein said first opcode entity comprises the ICE BKPT opcode entity (i.e., opcode F1) in the x86 microprocessor instruction set.

19. The instruction set extension apparatus as recited in claim 15, wherein said translation logic translates said escape tag and said accompanying parts into corresponding micro instructions that direct extended execution logic to perform said extended legacy operation.

20. The instruction set extension apparatus as recited in claim 15, wherein said translation logic comprises:
- escape tag detection logic, for detecting said escape tag, and for directing that said accompanying parts be translated according to extended translation conventions; and
- decoding logic, coupled to said escape tag detection logic, for performing translation of microprocessor instructions according to conventions of the existing microprocessor instruction set, and for performing translation of said corresponding instruction according to said extended translation conventions to allow execution of said extended legacy operation according to said floating point format.

21. The instruction set extension apparatus as recited in claim 15, wherein each of said plurality of floating point control words specifies a floating point precision and rounding mode.

22. The instruction set extension apparatus as recited in claim 15, wherein said each of said plurality of floating point control words further specifies a floating point exception mask.

23. A method for extending a microprocessor instruction set to provide for instruction-level specification of a floating point format, the method comprising:
- providing an extended instruction, the extended instruction including an extended tag along with an extended prefix, wherein the extended tag is a first opcode in the microprocessor instruction set that specifies a first legacy operation;
- via the extended tag, indicating that the extended instruction prescribes architecture extensions which include specification of the floating point format, and indicating that the extended prefix follows;
- prescribing, via the extended prefix and remaining parts of the extended instruction, a second legacy operation to be executed, wherein said prescribing comprises:
  - first specifying the second legacy operation via a second opcode in the microprocessor instruction set;
  - second specifying via the extended prefix one of a plurality of floating point control words, wherein the one of a plurality of floating point control words specifies the floating point format for the second legacy operation; and
- executing the second legacy operation according to said first and second specifying.

24. The method as recited in claim 23, wherein said providing comprises employing an 8-bit entity to configure the extended prefix.

25. The method as recited in claim 23, wherein said providing comprises selecting the first opcode from the x86 microprocessor instruction set.

26. The method as recited in claim 25, wherein said selecting comprises choosing the x86 ICE BKPT opcode (i.e., opcode F1) as the extended tag.

27. The method as recited in claim 23, wherein each of said plurality of floating point control words specifies a floating point precision and rounding mode.

28. The method as recited in claim 27, wherein the each of the plurality of floating point control words further specifies a floating point exception mask.

* * * * *